United States Patent [19]

Millward et al.

[11] Patent Number: 5,636,878
[45] Date of Patent: Jun. 10, 1997

[54] PIPE COUPLING

[75] Inventors: William A. Millward, Hereford; Alexander E. Bond, Faringdon; Geoffrey C. Eckold, Wantage; Stuart D. Marsh, Aylesbury, all of England

[73] Assignee: Royal Ordnance PLC., Chorley, England

[21] Appl. No.: 284,452

[22] PCT Filed: Dec. 2, 1993

[86] PCT No.: PCT/GB93/02484

§ 371 Date: Sep. 19, 1994

§ 102(e) Date: Sep. 19, 1994

[87] PCT Pub. No.: WO94/13993

PCT Pub. Date: Jun. 23, 1994

[30] Foreign Application Priority Data

Dec. 8, 1992 [GB] United Kingdom ............ 9225658
Feb. 18, 1993 [GB] United Kingdom ............ 9303282

[51] Int. Cl.⁶ .................................................. F16L 9/14
[52] U.S. Cl. .................. 285/55; 285/149; 285/305; 285/414; 285/423; 285/915; 285/373; 285/363
[58] Field of Search .......................... 285/305, 915, 285/423, 363, 149, 414, 415, 256, 259, 251, 55, 373

[56] References Cited

U.S. PATENT DOCUMENTS

| | | | |
|---|---|---|---|
| 2,371,971 | 3/1945 | Main et al. | 285/259 |
| 3,606,402 | 9/1971 | Medney | 285/305 |
| 3,759,553 | 9/1973 | Carter | 285/305 X |
| 3,759,554 | 9/1973 | Carter | 285/305 X |
| 4,111,469 | 9/1978 | Kavick | 285/256 |
| 4,156,540 | 5/1979 | Currie | 285/251 X |
| 4,614,369 | 9/1986 | Overath | 285/915 X |
| 4,619,470 | 10/1986 | Overath | 285/915 X |
| 5,082,314 | 1/1992 | Aubry et al. | 285/415 X |
| 5,152,556 | 10/1992 | Holland et al. | 285/915 X |
| 5,160,688 | 11/1992 | Hockett | 285/915 X |

FOREIGN PATENT DOCUMENTS

| | | |
|---|---|---|
| 770708 | 3/1957 | United Kingdom . |
| 966772 | 8/1964 | United Kingdom . |
| 1 255 413 | 12/1971 | United Kingdom . |
| 1 279 689 | 6/1972 | United Kingdom . |
| 1 294 658 | 11/1972 | United Kingdom . |
| 2 112 095 | 7/1983 | United Kingdom . |
| 2 205 913 | 12/1988 | United Kingdom . |

*Primary Examiner*—Dave W. Arola
*Attorney, Agent, or Firm*—Nixon & Vanderhye, P.C.

[57] ABSTRACT

The method of joining a coupling member to a pipe end is described. The method is particularly concerned with providing a coupling member on the end of a pipe of composite construction formed from a plurality of helically wound reinforcement strips of steel. The method comprises the steps of forming at least one generally circumferentially directed groove in the outer surface of the pipe wall adjacent the end of the pipe to a depth extending into the reinforcement core, providing a coupling member adapted to fit the end of the pipe overlapping the region of the groove or grooves, providing key means to extend between said sleeve and said groove in said pipe, providing a curable resin in the joint area between said pipe and said sleeve and curing said resin to bond said coupling member to said pipe end. The resultant coupling is of increased efficiency in providing both an adhesively bonded and mechanically coupled joint.

34 Claims, 4 Drawing Sheets

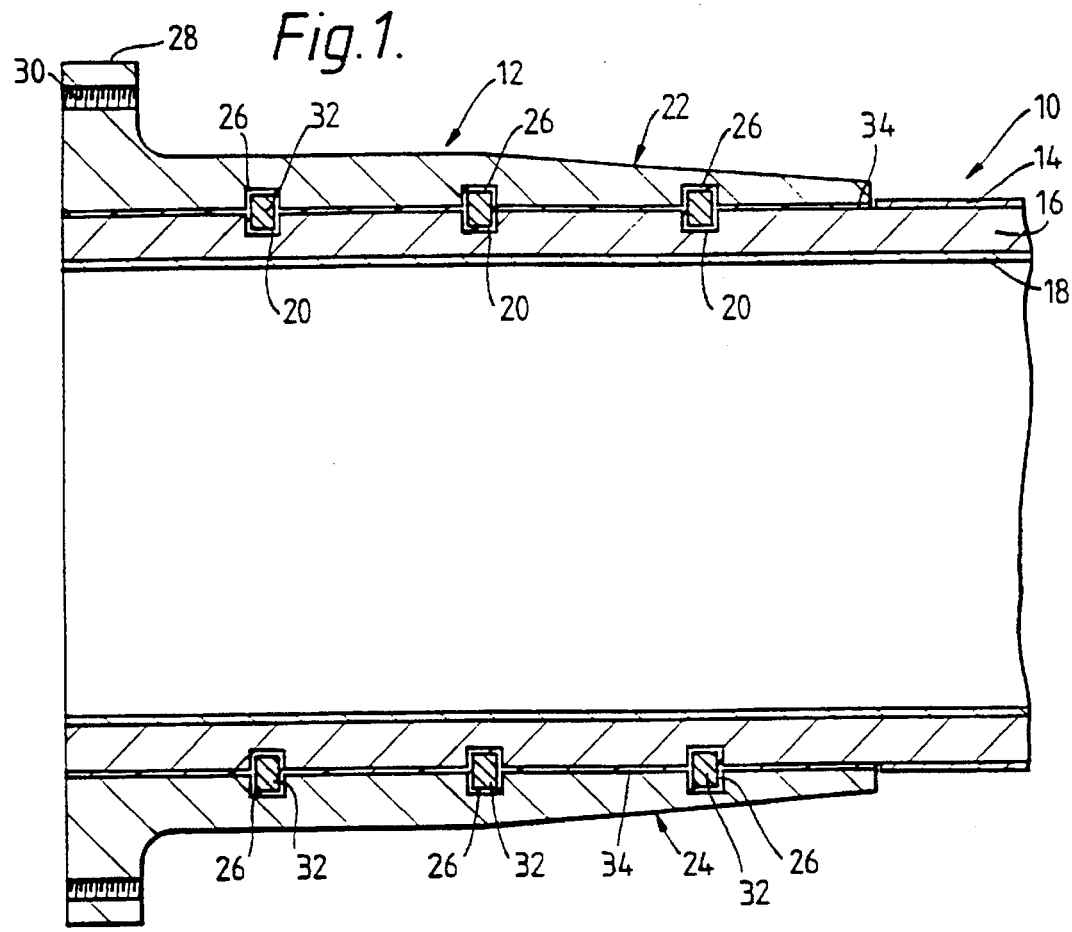
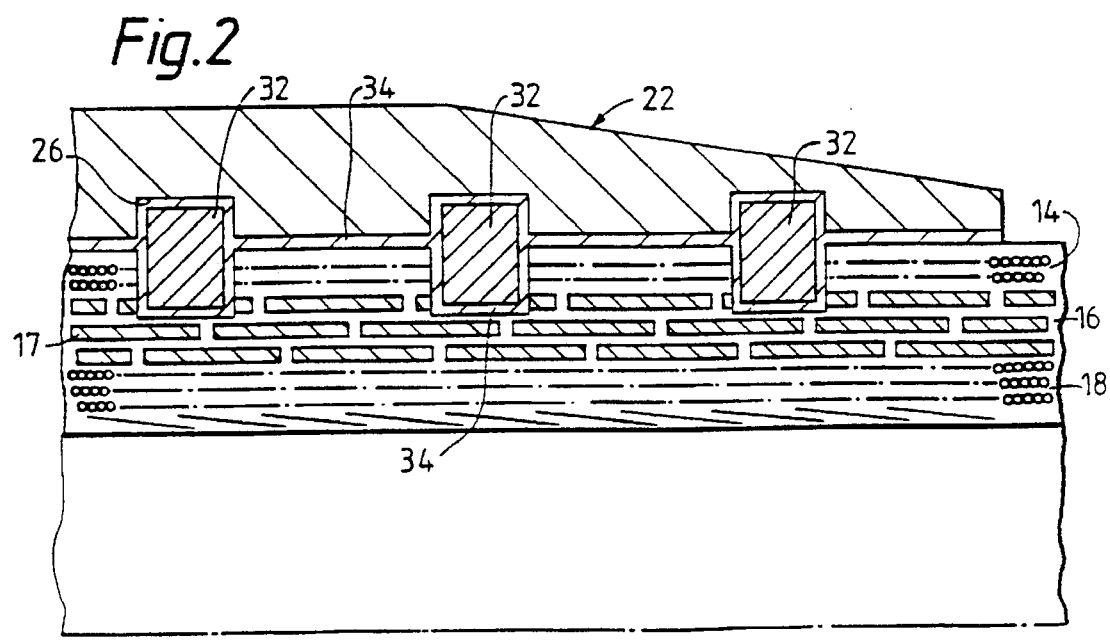

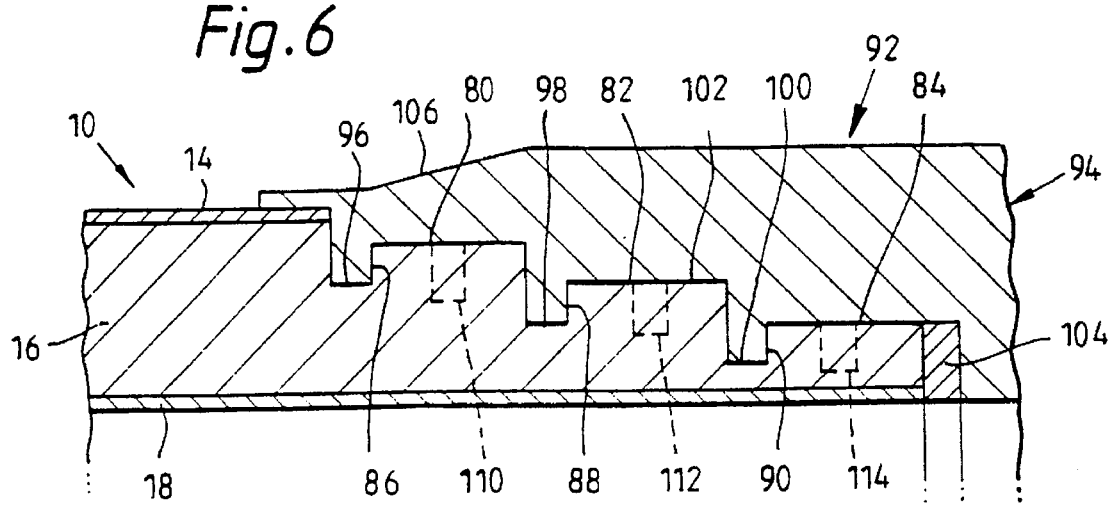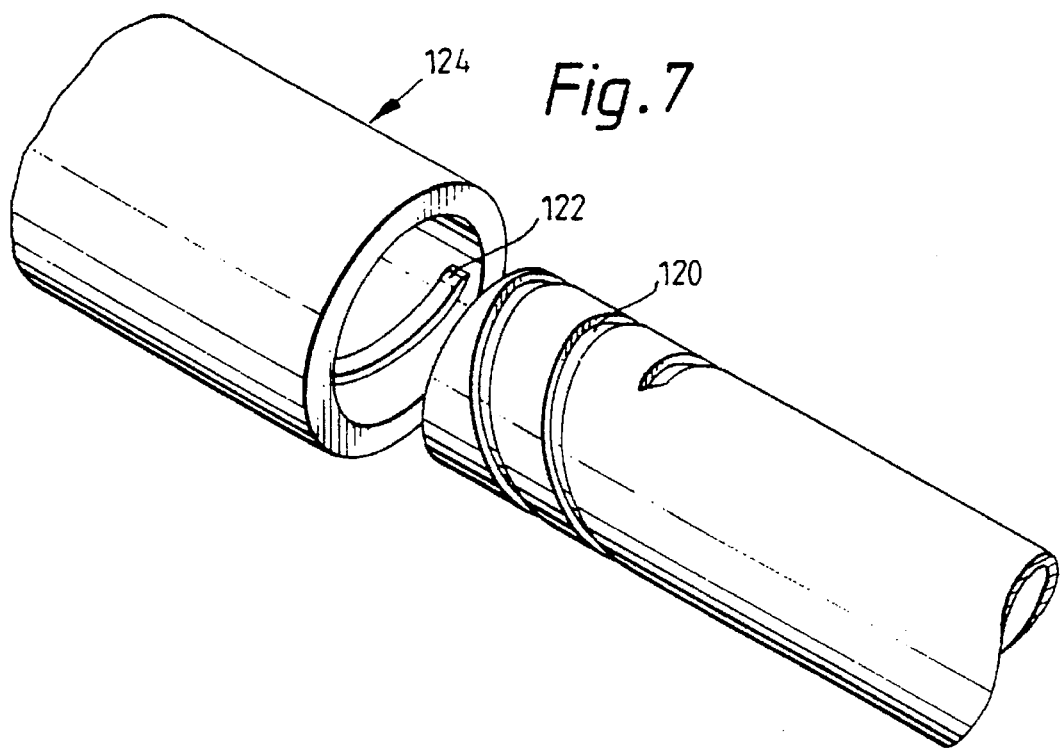

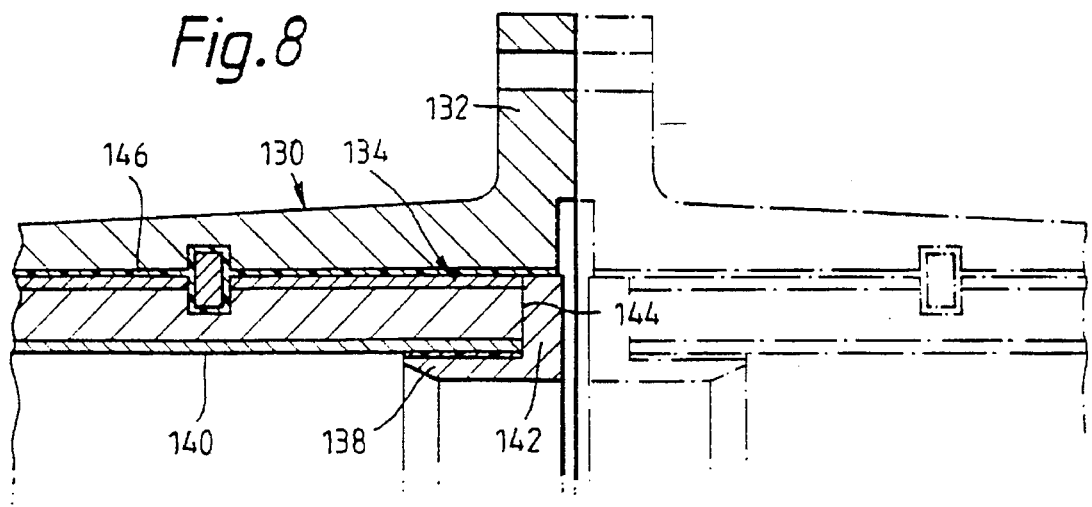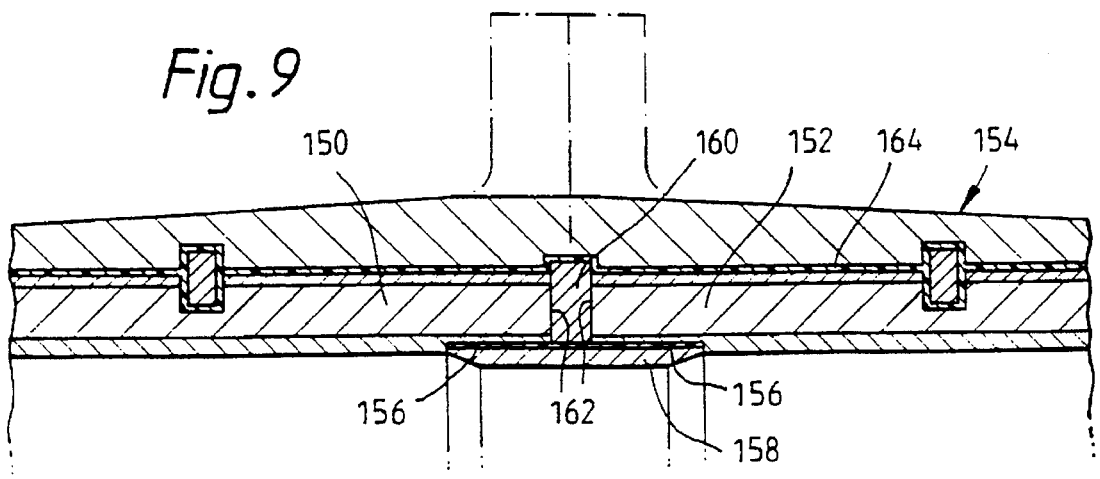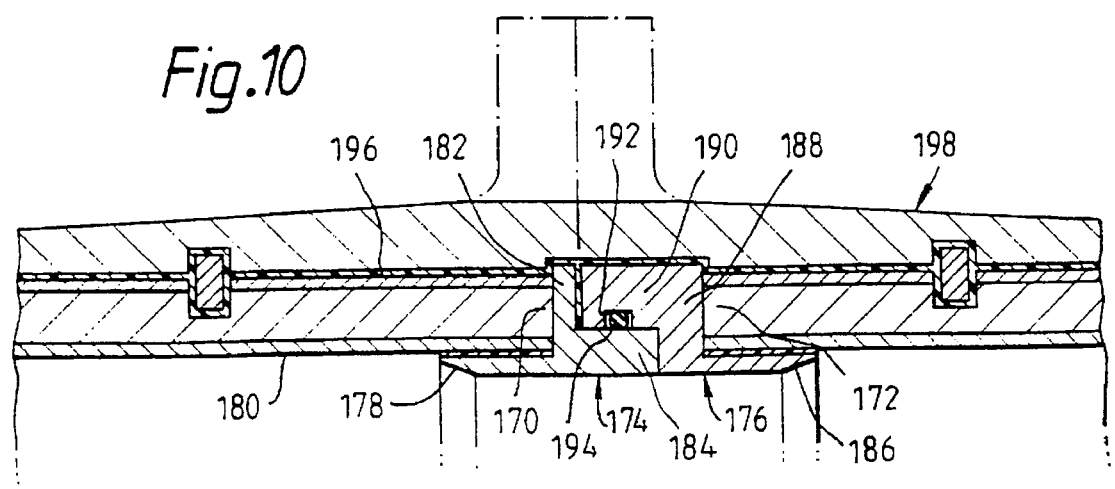

PIPE COUPLING

BACKGROUND OF THE INVENTION

1. Field of the Invention

The present invention relates to a method of attaching a coupling member to the end of a pipe particularly to the end of a composite construction formed from a plurality of helically wound reinforcement strips embedded in a resin matrix.

2. Discussion of Prior Art

In our co-pending international patent application number PCT/GB93/02483 (internal reference ROP0132) of common filing date herewith the contents of which are incorporated hereto by reference, we describe a pipe construction comprising a plurality of layers of steel strip which are helically wound to form a pipe and embedded in a resin matrix, the pipe further including inner and outer linings of filament wound fibre reinforce plastic. In order to utilise these pipes, it is necessary to be able to join together separate lengths or to join pipe lengths to plant. Conventional pipe joining techniques are not directly applicable either to pipe constructed as described or to the medium to high pressure applications which are envisaged.

SUMMARY OF THE INVENTION

According to a first aspect of the present invention there is provided, a method of joining a coupling member to an end of a composite construction pipe comprising a core formed from a plurality of layers of helically wound reinforcing strip embedded in a resin matrix, the method comprising the steps of forming at least one generally circumferentially directed groove in the surface of the pipe wall adjacent the end of the pipe to a depth which penetrates the reinforcing core of the pipe; (preferably to a depth no more than halfway through the core), providing a coupling member adapted to fit the end of the pipe and overlapping the region of the groove; providing key means to extend between said coupling member and into said groove; providing curable resin in the joint area between the pipe and said coupling member; and curing said curable resin to bond said coupling member to said pipe end.

Preferably the pipe has an internal and/or external lining of fibre reinforced plastic.

Preferably the reinforcement strip is of steel, and the coupling member and the key means are preferably also of steel or other material having similar mechanical properties.

The resin may be injected into the joint area after fitting the coupling member, and/or may be coated onto the joint mating faces prior to fitting.

In one embodiment, the coupling member may be of tubular construction having a circumferentially directed groove or grooves formed in the inner surface thereof and which are axially coincident with the at least one groove on the pipe. The sleeve may be provided with a tangential slot extending through the wall thickness to enable a flexible key member to be inserted into the two axially coincident grooves to extend therebetween.

The cooperating groove and key means may be cooperating screw threads.

In another embodiment of the pipe joint of the present invention, the coupling member may be provided in the form of a sleeve axially split into two halves. Each half may have formed in the inner cylindrical surface thereof a groove or grooves which are axially coincident with the at least one groove in the outer surface of the pipe wall. Separate key members of circular split-ring or part circular form may be provided which extend between both grooves and mechanically lock the pipe and the sleeve together in the axial direction. Alternatively, the sleeve halves may be provided with one or more integral, upstanding, radially inwardly directed key members which extend into the groove or grooves in the pipe.

In a further alternate construction, the key members may be provided by placing separate key members into the grooves in the pipe end and bonding and sealing these in place prior to fitting of the coupling member which has cooperating grooves. An advantage of this construction is that a finished and protected pipe unit may be supplied by a manufacturer.

The two halves of the coupling member may be positively engaged by an internally tapered collar member push fitted over the sleeve halves. The collar member may be removable or permanently connected to the sleeve member by means of injected curable resin for example.

Other means of maintaining the two halves of a split coupling member together may be employed and may comprise various forms of clamps, either permanent or temporary depending upon the application in addition to adhesive bonding.

By the method of the present invention, the pipe and its coupling member are permanently joined to ether by a combination of mechanical and adhesive means. Preferably the at least one groove extends into, but does not extend more than halfway through the total thickness of the reinforcing core. This will however vary depending upon the pipe diameter and the anticipated loading. The load transfer from the pipe to the coupling member is therfore transmitted by a combination of the adhesive bond strength, and mechanically transmitted load which is based on the interlaminar shear strength of the pipe construction itself. An advantage of the method of the present invention is that the efficiency of the adhesively bonded joint is improved by splitting it up into two or more shorter lengths by the key means and the grooves in the pipe end and/or coupling member, thus reducing the high tensile adhesive stress concentrations at the joint ends.

Analysis has shown that the efficiency of adhesively bonded joints is improved by reducing stiffness in the joint area enabling stresses to be more evenly distributed, which in turn reduces the stress peaks. In a joint formed in accordance with the present invention, a degree of additional flexibility is imparted to the pipe end and/or coupling member by the grooves which thus help to reduce the stress concentrations on each end of the joint. We have also found that the efficiency of the joint may be further enhanced by the use of geometrical features on the pipe end and/or coupling member. Preferably, the pipe end or coupling member or both may have a tapered portion over at least a part of the axial strength of the joint. The effect of such tapers is to further reduce stiffness in the joint area which further reduces the stress peaks. Desirably also, where more than groove is provided, the key members are of a material, e.g. ductile steel, which provides some resilience in the axial shear direction whereby to permit a more even distribution of axial mechanical loads between them.

The groove and key member combination serves not only to provide a mechanical locking means in the axial direction, but also to divide the total joint area into separate sections. The effect of this division of the joint area is to reduce peak stresses, reduce total stress within the joint and to provide a more even stress distribution in the joint. The consequence of this is to produce a joint having a higher load capability for a given bond length.

The coupling member may have similar features at its remote end to enable the joining together of two pipe lengths in a substantially identical fashion, or the coupling member may be provided with other joining means at its remote end. Such other joining means may comprise, for example, boltable flanges, weldable joints, screw threads, clamping or other locking devices.

Where there are two or more grooves provided in the outer surface of the pipe, these may be provided in stepped manner by providing the grooves at the junctions between or in pipe portions having successively reduced diameters.

The curable resin may be an epoxy resin or any other suitable for the application.

According to a second aspect of the present invention there is provided a coupling member for use in the method of the first aspect, the coupling member comprising a generally tubular body portion having key means extending radially from the surface thereof, said key means being adapted to engage with generally circumferentially extending grooves formed in the cylindrical surface of a cooperating pipe end, there being space between the overlapping surfaces of the body portion and the said pipe when assembled together to receive a curable resin to bond said pipe and said coupling member together.

There may also be provided at the junction between the pipe and the coupling member sealing means to protect the exposed end of the pipe from corrosion. Such sealing means may take the form of resin seals or separate polymeric plastics material seals as an additional member in the pipe joint construction.

The radially inwardly extending key means may be formed integrally with the bore of the coupling member or may be separate key members adapted to fit into grooves formed in the bore of the coupling member.

BRIEF DESCRIPTION OF THE DRAWINGS

In order that the present invention may be more fully understood, examples will now be described by way of illustration only with reference to the accompanying drawings, of which:

FIG. 1 shows an axial cross section through the end of a pipe joined to a coupling member;

FIG. 2 shows an enlarged axial cross section through part of the joint shown in FIG. 1;

FIG. 6 shows a partial axial cross section through a fourth embodiment of a joint between a pipe and coupling member;

FIG. 7 shows a further embodiment of a pipe coupling according to the present invention, and FIGS. 8 to 10 which show sections through pipes joined together in various ways having sealing means disposed between the exposed ends of the pipe portions.

DETAILED DISCUSSION OF PREFERRED EMBODIMENTS

Figure 3:
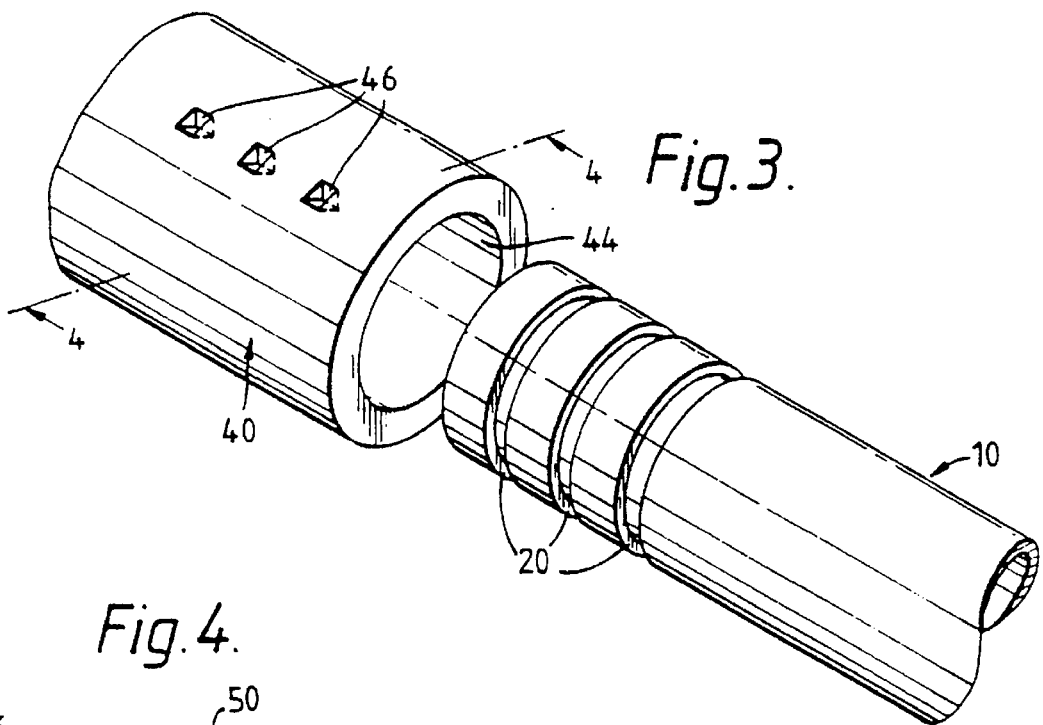
FIG. 3 shows a perspective view of a pipe end and a second embodiment of a coupling member prior to joining.

Referring now to the drawings and where the same features are denoted by common reference numerals.

FIG. 1 and 2 show an end of a pipe 10 having a coupling member 12 bonded thereto. The pipe 10 comprises an outer layer 14 of a filament wound, fibre reinforced resin material, a core layer 16 of a plurality of helically wound steel strips embedded in a resin matrix and an inner layer 18 of a filament wound, fibre reinforce resin material. The pipe 10 has the outer layer 14 removed to substantially the same axial extent as that of the coupling member 12. Three circumferential grooves 20 are cut in the outer surface of the pipe and extend into the core layer 16. The counting member 12 is axially split into two halves 22, 24 and each half has grooves 26 formed in the bore thereof which are axially coincident with the grooves 20 in the pipe. The counting member 12 is also provided with a flange member 28 having bolt holes 30 for joining other pipe sections (not shown) or to plant (not shown). Semi-circular key members 32 are inserted into and extend beyond the grooves 20 and 26 to mechanically lock the pipe and coupling member together in the axial direction. A curable resin 34 is injected into the gap between the pipe end surface and the bore of the coupling member. The resin is cured and adhesively bonds the pipe and coupling member together and also surrounds the key members 32. In effect, the adhesive joint between the two cylindrical surfaces of the pipe outer diameter and the coupling member bore is divided into four distinct bands which improves the efficiency of the bonded joint by reducing stress concentrations at the remote ends of the joint.

Figure 4:
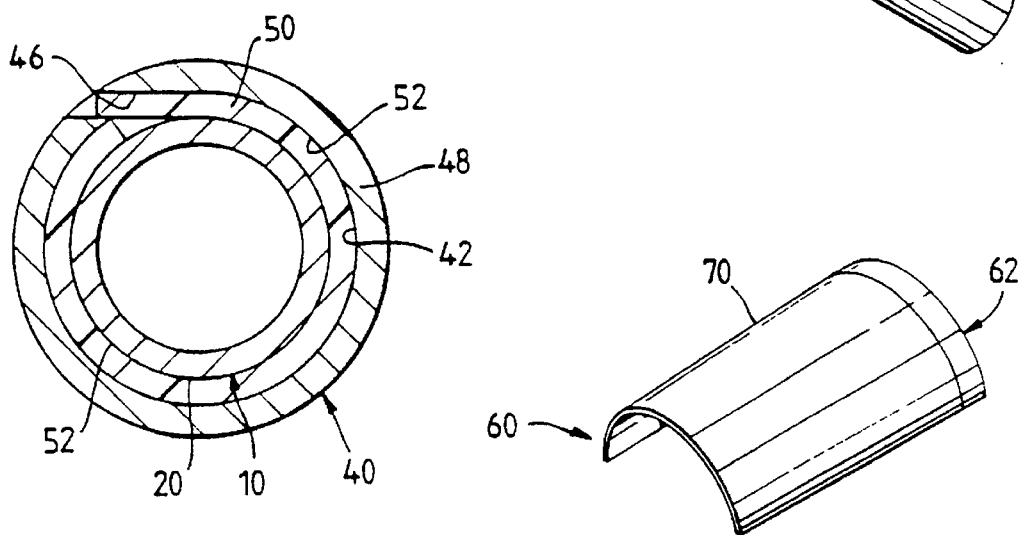
FIG. 4 shows a radial cross section through the joined pipe and coupling member indicated by the line 4—4 of FIG. 3.

FIGS. 3 and 4 show a second embodiment of a joint between a pipe 10 and a coupling member 40. The pipe has a similar construction to that described with reference to FIGS. 1 and 2 and has three grooves 20 cut in the end. The coupling member 40 has three axially coincident grooves 42 cut into the bore 44, each groove 42 having a tangential entry slot 46 cut through the tubular wall 48 of the coupling member. The pipe 10 is inserted into the coupling member 40 so that the grooves 20 and 42 are coincident and flexible key members 50 are inserted into the slots 46 to extend around and between the grooves 20, 42. With the pipe and coupling member axially locked together by the key members 50, a resin 52 is injected into the joint gap and is cured to adhesively bond the pipe, coupling member and key members together. The coupling member may be provided with any suitable means at its remote end for joining the pipe section to another pipe section or to plant.

Figure 5:
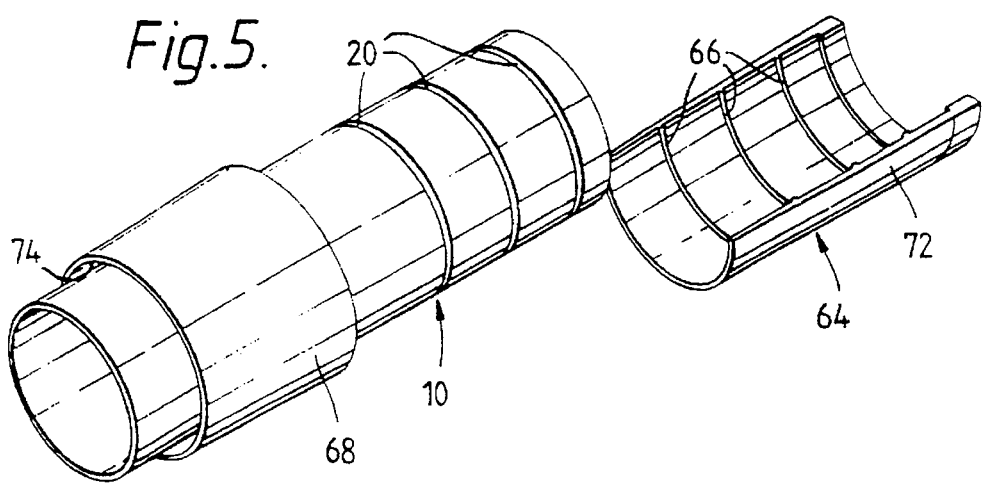
FIG. 5 shows a perspective view of a third embodiment of a coupling member.

FIG. 5 shows a perspective view of a third embodiment of a coupling member 60 and pipe 10. As before with reference to FIG. 1 and 2, the coupling member 60 comprises two halves 62, 64 and has grooves 66 to cooperate with grooves 20 in the pipe 10. However, in this embodiment, the coupling member 60 further includes a collar member 68 to lock the two halves 62, 64 together. The outer surfaces 70, 72 of the coupling member halves and the bore 74 of the collar member 68 have cooperating tapers. Semi-circular key members (not shown) extend between the grooves 20 and 66. As in the previous embodiments, a curable resin is injected into the gap between the pipe and coupling member to adhesively bond them together. The coupling halves 62, 64 and bore 74 of the collar member may be provided with suitable channels and recesses (not shown) such that the injected resin also bonds the collar to the outside of the coupling member halves.

FIG. 6 shows a cross section through a fourth embodiment of a joint according to the present invention. In this embodiment however, the end of the pipe 10 is formed with three different diameter portions 80, 82, 84, there being circumferential grooves 86, 88, 90 provided at the junctions between each diameter and extending into the core portion of the pipe. The coupling member 92 (shown in part only) is in two halves (only 94 shown in part), and, instead of grooves to receive separate key members, has three upstanding, radially directed key members 96, 98, 100 formed integrally in the bore. As before, a curable resin 102 is injected into the gap between the pipe and coupling member to adhesively bond them together. The injected resin 102 also forms a seal 104 on the exposed end of the pipe 16. The coupling member 92 is also provided with a tapered portion 106.

In a modification of the embodiment shown in FIG. 6 the grooves 86, 88 and 90 may be formed within the area of each reduced diameter portion as shown by dashed lines 110, 112 and 114. These alternative groove positions have corresponding groove positions in the coupling member 92.

FIG. 7 shows an embodiment where the cooperating grooves and key members are constituted by helically formed screw threads 120, 122. The pipe end has a helical groove 120 formed in the end whilst the coupling member 124 has an upstanding helical screw thread 122 formed in the bore thereof. The mechanical coupling between the pipes is augmented by a resin injected into the joint area between the components to provide an adhesive bond.

FIGS. 8 to 10 show embodiments having different means of sealing the exposed ends of the pipe. FIG. 8 shows a coupling member 130 having a flange feature 132 mating with a similar feature of another coupling shown only in dashed lines. Prior to fitting of the coupling member 130 to the pipe end 134, a soft polymeric plastics material seal member 136 is bonded to the end of the pipe. The seal member 136 has an axial ring portion 138 which is bonded to the pipe bore 140, and a radial ring portion 142 which is bonded to the pipe end 144. Pulling the flanges 132 together on tightening of two complementary coupling members causes the seal members to engage and seal together and also prevent access to the exposed pipe and face 144. As in previous embodiments, there is a resin adhesive 146 injected into the joint area between the coupling member and the pipe end.

FIG. 9 shows a joint between two pipe ends 150, 152 connected by a single coupling member 154 comprising two axially split halves (not shown). Prior to fitting the coupling member, the pipe ends are provided with rebates 156 into which is fitted a GRP ring member 158 which is bonded thereto. A compressible polymeric seal 160 is positioned between the pipe ends to protect the exposed end faces 162 of the pipe ends. After fitting of the coupling member 154, a resin 164 is injected into the joint area to seal the assembly and to adhesively bond the components together.

FIG. 10 shows an assembly similar to that of FIG. 9, but where the seal means comprises three separate members. Two mating pipe ends 170, 172 are each provided with seal member portions 174, 176. Seal member portion 174 has an axially directed flange portion 178 which is bonded to the bore 180 of the pipe end 170, and a radially directed portion 182 having a flange 184. The seal member portion 176 has an axially directed portion 186 bonded to the bore of the pipe end 172, and a radially directed portion 188 having a flange 190 which has a circumferential groove 192 in the inner diameter thereof. The flanges 184 and 190 cooperate to form a seal with the aid of an "O" ring 194 in the groove 192. A resin 196 is injected into the joint area to adhesively bond the coupling member 198 to the pipe ends 170, 172.

It will be appreciated that the integrally formed key members of FIG. 6 may be replaced with separate key members as shown in other embodiments, and similarly for example, the separate key members shown in FIGS. 1 and 5 could be replaced with key members formed integrally with the coupling member halves.

It is pointed out that although the invention has been described with reference to the bonding of a coupling member to a particular form of composite construction pipe, the method is equally applicable to other similar forms of pipe construction. For example, the inner and outer layers of filament wound fibre reinforced material may either be absent or may comprise layers of woven fibre or chopped strand mat.

We claim:

1. A method of joining a coupling member to the end of a rigid, non-flexible pipe, the method comprising the steps of:

forming at least one generally circumferentially directed groove in the surface of the pipe wall adjacent the end of the pipe;

providing a coupling member adapted to fit the end of the pipe and overlapping the region of the groove;

providing key means to extend between said coupling member and into said groove;

providing curable resin in the joint area between the pipe and said coupling member; and curing said curable resin to bond said coupling member to said pipe end, wherein the pipe is of composite construction comprising a core formed from a plurality of layers of helically wound steel reinforcing strip embedded in a resin matrix, and the depth of said groove and said key means extends at least partially into the reinforcing steel core of the pipe.

2. A method according to claim 1, further including the step of providing an internal lining of fibre reinforced plastic to said pipe.

3. A method according to claim 1 wherein said providing a coupling step and said providing key means step include providing the key means and coupling member of a material having similar mechanical properties as said reinforcing steel core.

4. A method according to claim 1 wherein said resin is injected into the joint area between the pipe and the coupling member after fitting of said coupling member to said pipe end.

5. A method according to claim 1 wherein the mating faces between said coupling member and said pipe end are coated with resin prior to fitting.

6. A method according to claim 1 wherein said providing a coupling step includes providing said coupling member with generally tubular construction.

7. A method according to claim 6 wherein said generally tubular coupling member surrounds the end of the pipe and providing said coupling member with a tangential slot through the wall thickness, said slot co-operating with a circumferentially extending groove in the coupling member and which groove accepts said key means inserted through said slot to engage with two axially coincident grooves in said coupling member and said pipe.

8. A method according to claim 6 further including the step of providing said cooperating groove and key means with cooperative screw threads.

9. A method according to claim 1, further including the step of providing said coupling member in the form of a sleeve axially split into two halves.

10. A method according to claim 9 wherein said axially split halves are provided with upstanding, radially inwardly directed key members which comprise said key means.

11. A method according to claim 9 wherein said pipe end is provided with separate upstanding key members which comprise said key means and are bonded and sealed into at least one groove in said pipe end prior to fitting of said coupling member.

12. A method according to claim 9 wherein said coupling member halves are positively engaged by an outer collar member fitted over the halves.

13. A method according to claim 9 further including providing said two halves with at least one groove axially coincident with said at least one groove in said pipe end.

14. A method according to claim 10 further providing separate key members adapted to extend between said grooves in said coupling member and said pipe.

15. A method according to claim 1 further providing said coupling member with at least a portion having a cross section which is tapered away from said pipe end.

16. A method according to claim 1 providing at least a portion of said pipe end tapered towards its open end.

17. A method according to claim 16 providing said taper in the form of progressively stepped portions having different diameters.

18. A method according to claim 1 providing said coupling member with features selected from the group comprising: boltable flanges; weldable points; screw threads; clamping devices; and locking devices.

19. A method according to claim 1 further including the fitting of sealing means adjacent the axial free end of said pipe end.

20. A combination of a rigid, non-flexible pipe and a coupling member joined to at least one end of said pipe, said pipe having a pipe wall of composite construction comprising a core formed of a plurality of layers of helically wound steel reinforcing strip embedded in a resin matrix, the combination comprising:

at least one circumferentially directed groove in the surface of the pipe wall adjacent said at least one end of the pipe, said groove extending at least partially into at least one layer of said steel reinforcing strip;

said coupling member being adapted to fit said at least one end of the pipe and overlapping the region of the groove;

key means extending between said coupling member and into said groove and at least partially into said reinforcing strip;

cured resin, in the joint area between said at least one end of said pipe and said coupling member, bonding said at least one end of said pipe to said coupling member.

21. A combination of a rigid, non-flexible pipe and coupling member as claimed in claim 20 wherein the coupling member includes a generally tubular body portion having a bore to receive said at least one end of said pipe.

22. A combination of a rigid, non-flexible pipe and coupling member as claimed in claim 21 wherein the key means extends radially inwardly from the bore of the generally tubular body portion of said coupling member to engage the generally circumferentially extending groove in the surface of the at least one end of said pipe.

23. A combination of a rigid, non-flexible pipe and coupling member as claimed in claim 21 wherein said key means are formed integrally with the bore of said generally tubular body portion.

24. A combination of a rigid, non-flexible pipe and coupling member as claimed in claim 21 wherein said key means are formed separately from said body portion.

25. A combination of a rigid, non-flexible pipe and coupling member according to claim 21 wherein the generally tubular body portion of said coupling member has a tangential slot through the wall thickness thereof, said slot co-operating with a circumferentially extending groove in said coupling member, said groove receiving said key means which is inserted through said slot to simultaneously engage said grooves in said coupling member and in said pipe.

26. A combination of a rigid, non-flexible pipe and a coupling member as claimed in claim 21 wherein said key means and said groove in said pipe are in the form of co-operating screw threads.

27. A combination of a rigid, non-flexible pipe and a coupling member as claimed in claim 21 wherein at least a portion of the end of said pipe is tapered towards its open end.

28. A combination of a rigid, non-flexible pipe and a coupling member as claimed in claim 27 wherein said tapered portion is in the form of stepped portions having progressively reducing diameters towards the open end of the pipe.

29. A combination of a rigid, non-flexible pipe and coupling member as claimed in claim 21 wherein said generally tubular body portion comprises two halves, said body portion split in an axial direction.

30. A combination of a rigid, non-flexible pipe and a coupling member as claimed in claim 29 further including an outer collar fitted over the halves wherein said two halves of said body portion are positively engaged with each other.

31. A combination of a rigid, non-flexible pipe and coupling member as claimed in claim 20 wherein said pipe has internal and external linings of fibre reinforced plastics material.

32. A combination of a rigid, non-flexible pipe and a coupling member as claimed in claim 20 wherein said coupling member has a connection enabling feature on an end remote from said pipe, the feature being selected from the group comprising: a boltable flange; a weldable joint, a screw thread; a clamping device; and, a locking device.

33. A method according to claim 1, wherein the pipe has an external lining of fibre reinforced plastic.

34. A method according to claim 33, wherein the key means and coupling member are of a material having similar mechanical properties as said reinforcing steel core.

\* \* \* \* \*